June 29, 1926.

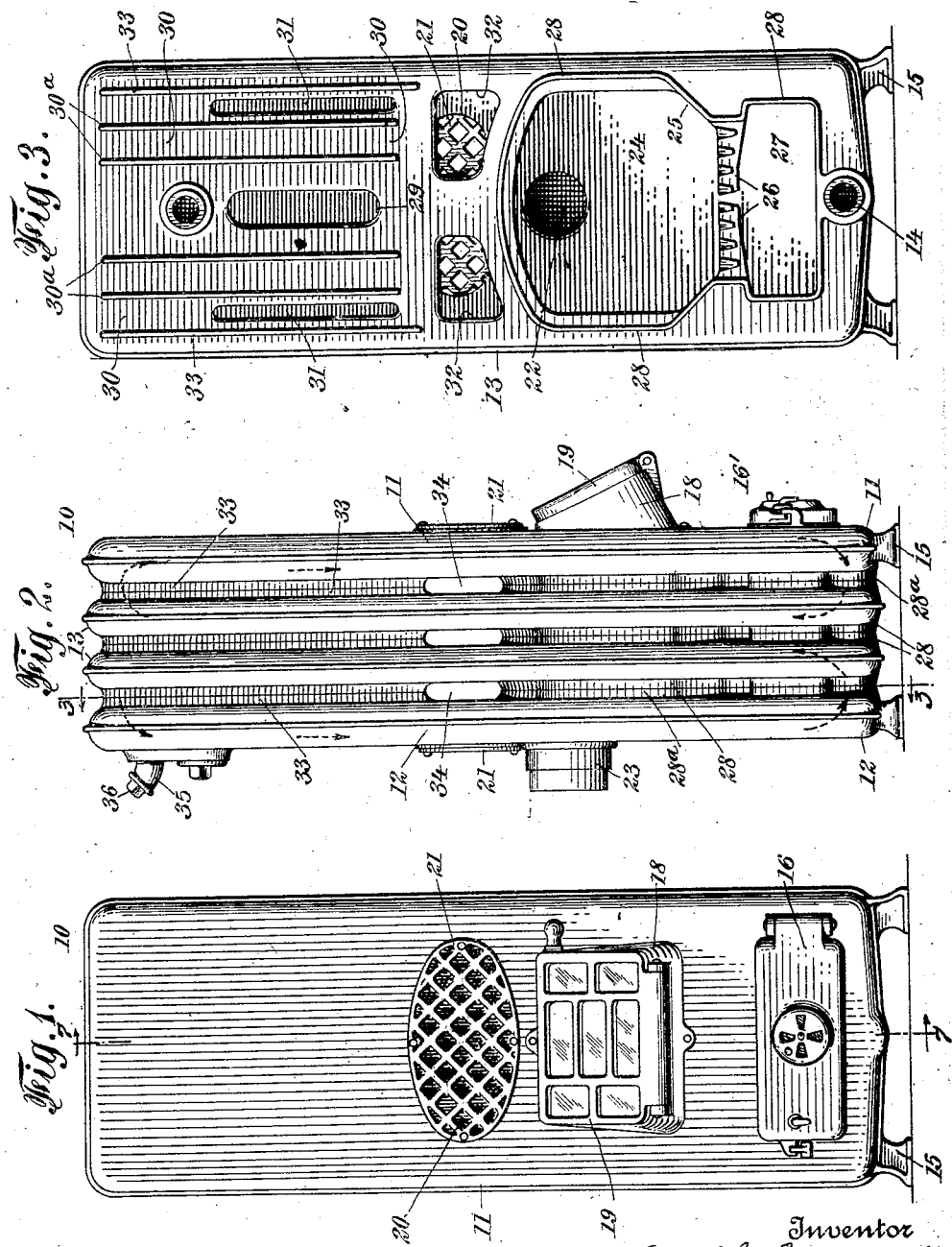

A. M. MERTZANOFF 1,590,588

HEATING APPARATUS

Filed March 5, 1921 3 Sheets-Sheet 2

Inventor
André M. Mertzanoff
BY
Conrad A. Dieterich
his ATTORNEY

June 29, 1926. 1,590,588
A. M. MERTZANOFF
HEATING APPARATUS
Filed March 5, 1921  3 Sheets-Sheet 3
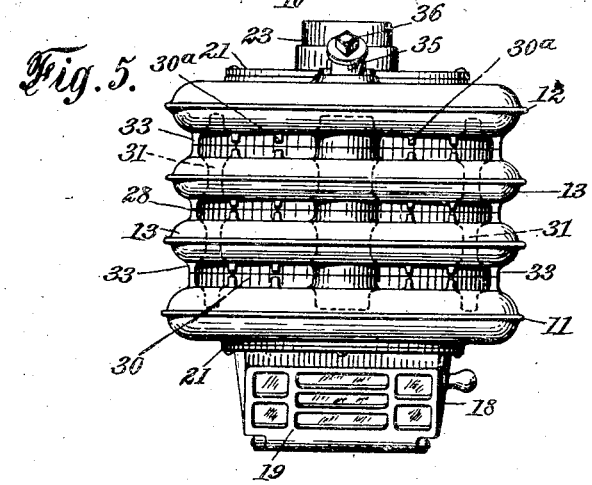
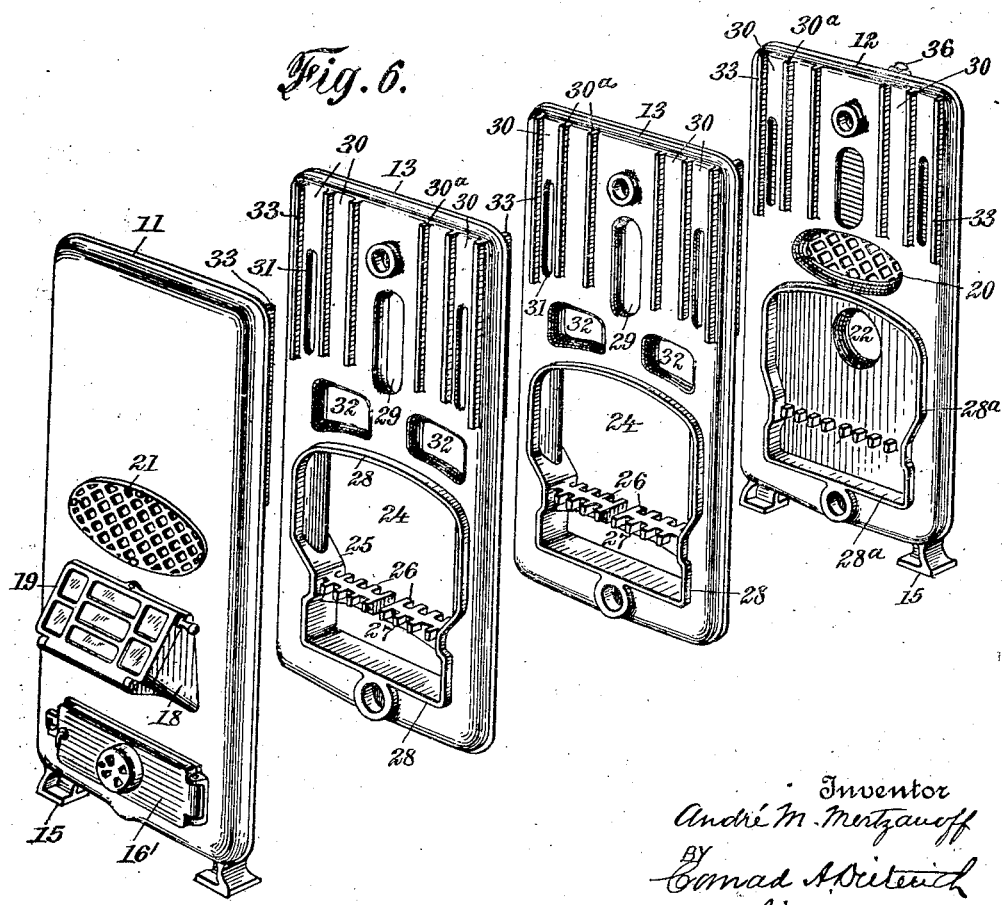

Patented June 29, 1926.

1,590,588

UNITED STATES PATENT OFFICE.

ANDRÉ M. MERTZANOFF, OF NEW YORK, N. Y., ASSIGNOR TO AMERICAN RADIATOR COMPANY, OF CHICAGO, ILLINOIS, A CORPORATION OF NEW JERSEY.

HEATING APPARATUS.

Application filed March 5, 1921. Serial No. 450,040.

My invention relates to improvements in heating apparatus, and, in its broadest conception, has for its object to provide, as a substitute for the ordinary coal stove, a heating apparatus comprising a heat absorbing member and an air heating member formed as a unitary structure, through which a confined fluid is circulated as the heating medium.

In its more specific embodiment, said invention has for its object to provide a small and compact apparatus formed as a complete, operative unitary structure comprising a heat absorbing member and a heat emitting member formed as an integral part thereof, by means of which the room or part of a building in which the apparatus is located may be readily and economically heated.

Further, said invention has for its object to provide a heating apparatus formed as a small, compact unit comprising a plurality of connected sections incorporating a heat absorbing member and a heat emitting member in which the confined heating fluid is caused to circulate within each section, and through the connected sections jointly whereby to provide a plurality of currents certain of which circulate through said apparatus longitudinally as a whole, and others of which circulate severally through said sections transversely of the apparatus.

Further, said invention has for its object to provide a heating apparatus comprising a boiler and a heat emitting element formed integrally therewith but separated therefrom by a chamber in which air at room temperature is received, caused to be heated by said heat emitting element, and finally discharged into the room.

Further, said invention has for its object to provide a heating apparatus of the character specified in which the confined heating medium circulating through said heat absorbing and said heat emitting members may be maintained at a high temperature by the consumption of a comparatively small volume of fuel.

Further, said invention has for its object to provide an apparatus of the character specified in which all of the heat absorbing surfaces are brought into close proximity to the incandescent fuel whereby to cause the confined heating medium circulating within the apparatus to be rapidly and efficiently heated, and thereafter maintained at high temperature.

Further, said invention has for its object to provide an apparatus of the character specified by means of which the extremely large percentage of the produced heat, which is ordinarily lost through radiation in heating apparatus now in common use, may be utilized to increase the room heating efficiency of the apparatus.

Further, said invention has for its object to provide heating apparatus wherein the confined fluid which constitutes the heating medium and which circulates within the hollow walls of the entire apparatus serves as the cooling medium to prevent the overheating or burning out of those parts thereof which are exposed to or contact directly with the burning fuel.

Further objects will in part be obvious, and in part be pointed out hereinafter.

To the attainment of the aforesaid objects and ends, my invention consists in the novel details of construction, and in the combination, connection and arrangement of parts hereinafter more fully described and then pointed out in the claims.

In the accompanying drawings illustrating one form of apparatus constructed according to and embodying my said invention—

Figure 1 is a front elevation of a heating apparatus;

Fig. 2 is a side elevation;

Fig. 3 is a section on the line 3—3 of Fig. 2;

Fig. 5 is a top view;

Fig. 6 is a perspective view showing the several parts in separated relation.

Figure 4:
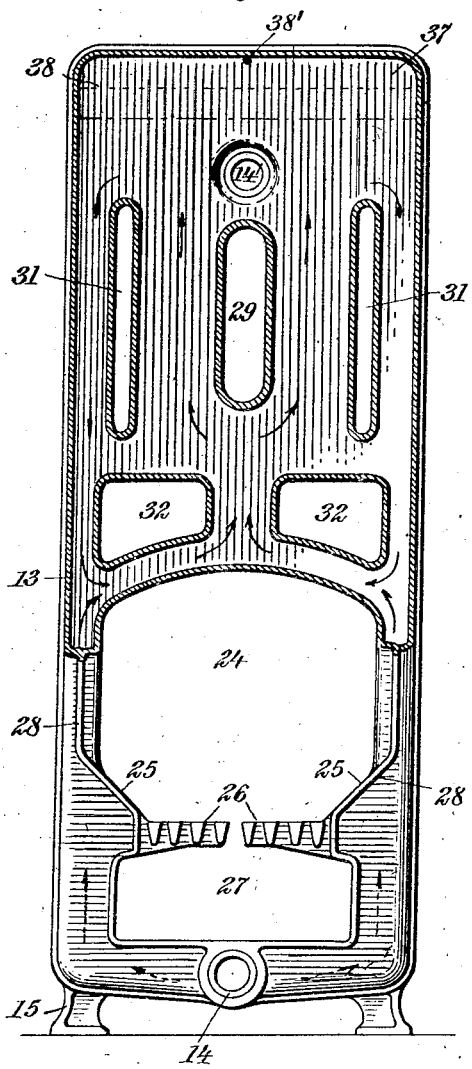
Fig. 4 is a face view of one of the elements of the apparatus, the same being partly broken away and in section.

In said drawings, 10 designates the apparatus as a whole, which comprises hollow front and back sections 11, 12, respectively, and intermediate sections 13 which are connected together at their upper and lower ends and to said front and back sections by nipples 14.

The apparatus as a whole is supported in raised position by feet 15 provided at the lower ends of the front and back sections. The front section 11 is provided adjacent to its base with an ash pit opening 16 provided with a hinged door 16′, above said ash pit opening with a fuel opening 17 provided with a projecting frame portion 18 having a hinged door 19 secured thereto, and above said fuel opening and about midway of the height of said front and back sections 11, 12, the apparatus is provided with air inlet openings 20 over which are secured grills or perforated plates 21.

The back section 12 is otherwise unbroken except near its central portion below the air inlet opening 20 where the same is provided with a circular opening 22 communicating with the upper rear portion of the combustion chamber. 23 denotes a casting which is bolted to the rear side of the back section, over the opening 22, to receive one end of a stove pipe or flue.

Each section 11, 12 and 13 consists essentially of a lower or heat absorbing portion, and an upper air heating member or portion.

The lower or heat absorbing portion of each intermediate section 13 is provided with a large opening 24 having inwardly inclined portions 25 at its sides terminating in two hollow water-backed grate-bar members or parts 26, the space above said grate bars forming a fuel receptacle and a combustion chamber, and the reduced space below said grate bars forming the ash pit 27.

Each intermediate section 13 is provided upon its opposite sides with a continuous, laterally-extending, enclosing rib or flange 28 which follows the general contour of the openings 24 forming the fuel receptacle, combustion chamber and the ash pit 27.

The rear surface of the front section 11, and the front surface of the back section 12 are also provided with continuous ribs or flanges 28ª registering with the ribs or flanges 28 of the intermediate sections 13 to form the complete fuel receptacle and ash pit. Further, said back and front sections may also have the inner portions thereof which are arranged within said ribs 28ª recessed to correspond with the openings 24, 27 of the intermediate sections, in order to increase somewhat the area of said openings.

The upper or air heating portion of each section is flat and is preferably provided with a central vertical opening 29 which registers with corresponding openings in the adjacent sections and jointly forming a horizontal passage for the air to be heated. The said upper portions are arranged in spaced relation parallel to one another and are provided upon their opposite surfaces with registering vertical ribs 30ª to form a series of vertical air passages 30 intermediate the same. The said upper portions are further provided at each side of the central opening 29 with vertical openings 31, the walls of which serve as partitions to cause the confined heating fluid to follow definite or predetermined courses of travel.

The said upper or air heating portions are separated from the lower or heat absorbing portions by one or more openings 32 which register with one another and the openings 20 in said front and back sections 11, 12 to form therewith longitudinal air chambers or compartments communicating at their opposite ends with said inlet openings 20 in the front and back sections 11, 12.

The upper portions of the front, back and intermediate sections may be provided along their vertical edges with laterally extending ribs 33 which register with the corresponding ribs of adjacent sections to form side walls for the air passages 30, and to induce, through the passages 30, a more active circulation of the air entering the inlet openings 20 in the front and back sections 11, 12, and the side openings 34, provided at the sides of the apparatus intermediate the heat absorbing portions and the air heating portions of the apparatus.

The rear section 12 is provided a short distance below its upper edge with a filling nozzle 35 whose lower end is screw-threaded and secured within a bushing in a horizontal plane above the nipples 14 which connect the intermediate sections 13 together and to the end sections 11, 12. The nozzle 35 is provided with a removable screw-threaded sealing plug or cap 36.

The position and arrangement of the filling nozzle 35 are such that it becomes impossible to fill the apparatus with water above the lower edge of said nozzle, and as a result a fixed water line is established and the upper part of each section is made to serve as an independent or separate expansion chamber 37 into which the water, when expanded, may rise to about the level indicated by the dotted line 38, Fig. 4. To prevent any compression of the air which would otherwise be trapped in said expansion chamber 37, the upper end of each section is provided with a separate air vent or relief opening 38′.

Figure 7:
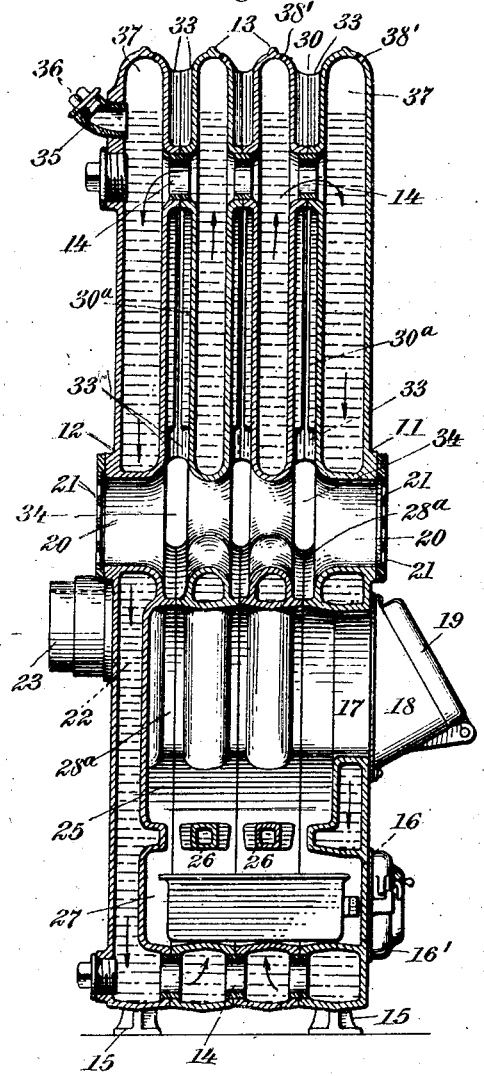
Fig. 7 is a vertical sectional view on the line 7—7 of Fig. 1.

The operation of the apparatus is as follows:

The apparatus is first filled with water through the filling nozzle 35 until the level reaches the lower edge of the nozzle, as indicated at Fig. 7. Hereupon, the cap or plug 36 is tightly secured therein in order to seal the same. The fuel is then introduced through the fuel opening covered by the door 19 and ignited. As soon as the fuel is properly ignited and burning, the confined water within the end, back and intermediate sections will become heated and begin to circulate in the lower or heat absorbing portion of the apparatus as well as the upper or air heating part thereof. The circulation assumes a plurality of courses, the course of one set of currents being severally through each section individually, as shown by the arrows at Fig. 4, and the course of the other currents being longitudinally through the connected sections constituting the apparatus as a whole, as shown by the dotted arrows at Fig. 7.

When the confined heating fluid circulating through the entire apparatus imparts its heat to the outer or exposed walls of the several sections, and more particularly to the upper or air heating portions of the apparatus, air at room temperature will be drawn into the air chamber and into the several passages communicating therewith through the inlet openings 20 in the front and back sections, communicating with the longitudinal air chambers formed by the openings 32, and through the openings 34 provided at the opposite sides of the apparatus between the heat absorbing and the air heating parts. The said air inlets 20, 34 all serve to admit air to the vertical air passages 30 provided intermediate the upper portions of the apparatus, which latter will cause the air to be heated by its contact with the hot walls thereof and to issue from the top of the apparatus.

The air so heated is then discharged into the room, relatively cooler air taking its place and thus producing a constant circulation by its repeated passage through the apparatus.

It is to be noted particularly that by means of my said apparatus the fluid heating medium which is confined within the apparatus is caused to circulate therein longitudinally through the apparatus and transversely through each of the sections severally, thereby insuring a lively and vigorous circulation of the heating fluid at a uniformly high temperature which results in a rapid exchange of heat.

Further, it is to be noted that the ratio of the heat emitting surface to the heat absorbing surfaces is unusually large, being as much as 17 of the former to 1 of the latter. This unusually large ratio is possible owing to the fact that full advantage has been taken of the high heat transmitting value of the contact surfaces, i. e., those surfaces which are directly exposed to or in contact with the incandescent fuel and to the hot gases and products of combustion produced by or liberated therefrom.

It will, of course, be understood that while I have shown an apparatus consisting of four sections, viz, a front, back and two intermediate, any number of intermediate sections may be assembled to form an apparatus of desired size and capacity.

Having thus described my said invention what I claim and desire to secure by Letters Patent is:

1. An apparatus of the character specified formed as a unitary structure comprising a plurality of connected sections confining a circulating heating fluid, said sections having their lower portions in contact to form a fuel receptacle and combustion chamber, and their upper portions comprising relatively thin, hollow panels separated from one another; said panels jointly forming a heat emitting member with air passages therein, substantially as specified.

2. An apparatus of the character specified formed as a unitary structure comprising a plurality of connected sections confining a circulating heating fluid, said sections having their lower portions in close contact to form a fuel receptacle and combustion chamber, and their upper portions separated from one another to form a heat emitting member composed of relatively thin sections arranged in spaced relation to permit of the passage of air therebetween; the upper ends of said sections severally forming expansion chambers therefor, substantially as specified.

3. An apparatus of the character specified formed as a unitary structure comprising a plurality of connected sections confining a circulating heating medium, a part of each section contacting with the corresponding parts of adjacent sections and serving as a heat absorbing portion, and another part composed of flat hollow portions arranged in spaced relation to the corresponding parts of said adjacent sections to permit of the passage therebetween of air to be heated, substantially as specified.

4. An apparatus of the character specified formed as a unitary structure comprising a plurality of connected sections confining a circulating heating medium, a part of each section contacting with the corresponding parts of adjoining sections to form a fuel receptacle and combustion chamber, and another part composed of relatively thin portions arranged in spaced relation to the corresponding parts of said adjacent sections and forming therewith a heat emitting member having passages therein for air to be heated, substantially as specified.

5. An apparatus of the character specified formed as a unitary structure comprising a plurality of hollow, connected sections confining a circulating heating fluid and arranged vertically one behind the other; the lower portions of said sections forming a fuel receptacle and combustion chamber and an ash pit, and the upper portions thereof forming a series of separated air heating members, substantially as specified.

6. An apparatus of the character specified formed as a unitary structure comprising a plurality of hollow, connected sections confining a circulating heating fluid and arranged vertically one behind the other; the lower portions of said sections forming a double walled fuel receptacle and combustion chamber, and the upper portions thereof forming single walled heating members separated from the adjacent members by air passages, substantially as specified.

7. An apparatus of the character specified formed as a unitary structure comprising a plurality of hollow connected sections confining a circulating heating fluid and arranged vertically one behind the other; the lower portions of said sections forming a double walled fuel receptacle and combustion chamber, and the upper portions thereof forming a heating member composed of a plurality of single walled portions each comprising a relatively thin flat section separated from the adjacent sections by air passages one of said sections having a filling nozzle below the top thereof, and the upper end of each of said sections above the plane of said nozzle forming an expansion chamber, substantially as specified.

8. An apparatus of the character specified formed as a unitary structure comprising a plurality of hollow connected sections confining a circulating heating fluid, the lower portions of said sections forming a fuel receptacle and combustion chamber, and the upper portions thereof forming a series of separated air heating members, and deflecting means on said upper portions for directing the flow of said heating fluid therethrough, substantially as specified.

9. An apparatus of the character specified formed as a unitary structure comprising a plurality of hollow, connected sections confining a circulating heating fluid, the lower portions of said sections forming a fuel receptacle and combustion chamber, and the upper portions thereof forming a series of separated air heating members, and means associated with said said upper portions of said sections for directing the circulation of the heating fluid therethrough, substantially as specified.

10. An apparatus of the character specified formed as a unitary structure comprising a plurality of hollow connected sections confining a circulating heating fluid; said sections having openings in their lower portions, laterally extending ribs surrounding said openings adapted to engage with the registering lateral ribs of adjacent sections and forming a fuel receptacle and combustion chamber, and the upper portions of said sections forming a series of relatively thin separated air heating members, substantially as specified.

11. An apparatus of the character specified formed as a unitary structure comprising a plurality of hollow connected sections confining a circulating heating fluid, said sections having openings in their lower portions, laterally extending ribs surrounding said openings adapted to engage with the registering lateral ribs of adjacent sections and forming a fuel receptacle and combustion chamber and an ash pit, and the upper portions of said sections forming a series of separated air heating members, substantially as specified.

12. An apparatus of the character specified formed as a unitary structure comprising a plurality of connected sections confining a circulating heating fluid, a part of each section contacting with the corresponding parts of adjacent sections and serving as a heat absorbing member, and another part composed of relatively shallow hollow portions arranged in spaced relation to the corresponding parts of said adjacent sections and forming an air heating member having air passages therein, and an air chamber separating said heat absorbing member from said air heating member and communicating with the air passages in said air heating member; said air chamber having intake openings for admitting air thereto, substantially as specified.

13. An apparatus of the character specified formed as a unitary structure comprising a plurality of connected sections confining a circulating heating fluid, a part of each section contacting with the corresponding parts of adjacent sections and serving as a heat absorbing member, and another part arranged in spaced relation to the corresponding parts of said adjacent sections, registering ribs arranged upon the opposite sides of said sections; said sections and ribs forming an air heating member having air passages therebetween, and an air chamber separating said heat absorbing member from said air heating member and communicating with the air passages in said air heating member; said air chamber having intake openings for admitting air thereto, substantially as specified.

14. An apparatus of the character specified formed as a unitary structure comprising a plurality of connected sections confining a circulating heating fluid, a part of each section contacting with the corresponding parts of adjacent sections and serving as a heat absorbing member and another part arranged in spaced relation to the corresponding parts of said adjacent sections and forming an air heating member having air passages therein, filling means for said connected sections arranged adjacent to the top of the apparatus; the portion of each of said sections above the plane of said filling means forming an expansion chamber, and an air chamber intermediate said heat absorbing member and said air heating member communicating with the air passages in said air heating member; said air heating member having intake openings for admitting air thereto, substantially as specified.

15. An apparatus of the character specified formed as a unitary structure comprising a plurality of connected sections confining a circulating heating fluid, a part of each section contacting with the corresponding parts of adjacent sections and serving as a heat absorbing member, and another part arranged in spaced relation to the corresponding parts of said adjacent sections forming an air heating member having air passages therein, a filling nozzle for said connected sections arranged adjacent to the top of the apparatus; the upper end of each of said sections above the plane of said nozzle forming an expansion chamber, and an air chamber separating said heat absorbing member from said air heating member and communicating with the air passages in said air heating member; said air heating member having intake openings for admitting air to said air chamber and for admitting air directly to said passages, substantially as specified.

16. An apparatus of the character specified formed as a unitary structure comprising a plurality of connected sections confining a circulating heating fluid, the lower portions of each of said sections forming a fuel receptacle part and combustion chamber part, and the upper portions thereof cooperating to form a series of separated vertical air heating members arranged in spaced relation to provide passages for air therebetween, and said sections having openings jointly forming an air chamber extending longitudinally of the apparatus and separating the upper from the lower portions of said sections and communicating with said air passages; said air heating members having air intake openings for admitting to said air chamber the air to be heated, substantially as specified.

17. An apparatus of the character specified formed as a unitary structure comprising front and back sections and intermediate sections confining a circulating heating fluid; the lower portions of said sections including a grate, and forming a fuel receptacle and combustion chamber, and the upper portions thereof forming a series of vertical air heating members arranged in spaced relation to each other to permit of the passage of air therebetween, and an air chamber extending longitudinally of the apparatus between the upper and lower portions of said sections and communicating with said air passages, and said end sections having inlet openings therein communicating with said air chamber for admitting thereto air to be heated, substantially as specified.

18. An apparatus of the character specified formed as a unitary structure comprising hollow front and back sections and intermediate sections confining a circulating heating fluid; the lower portions of said sections including a grate, and forming a fuel receptacle and combustion chamber, and the upper portions thereof forming a series of vertical air heating members arranged in spaced relation to each other to permit of the passage of air therebetween, and an air chamber extending longitudinally through the apparatus and substantially separating the upper from the lower portions of said sections and communicating with said air passages; said end sections having air intake means therein communicating with said air chamber for admitting thereto air to be heated, substantially as specified.

19. An apparatus of the character specified formed as a unitary structure comprising hollow front and back sections and intermediate sections confining a circulating heating fluid; the lower portions of said sections including a grate, and forming a fuel receptacle and combustion chamber, and the upper portions thereof forming a series of relatively shallow, flat vertical air heating members arranged in spaced relation to each other to permit of the passage of air therebetween, a filling nozzle on one of said connected sections adjacent to the upper end thereof; the upper end of each of said air heating members above the plane of said nozzle forming an expansion chamber, an air chamber extending longitudinally through the apparatus and separating the upper from the lower portions of said sections and communicating with said air passages; said end sections having air inlet means therein communicating with said air chamber for admitting thereto the air to be heated, substantially as specified.

Signed at the city of New York, in the county and State of New York, this second day of March, one thousand nine hundred and twenty-one.

ANDRÉ M. MERTZANOFF.